United States Patent Office 3,270,079
Patented August 30, 1966

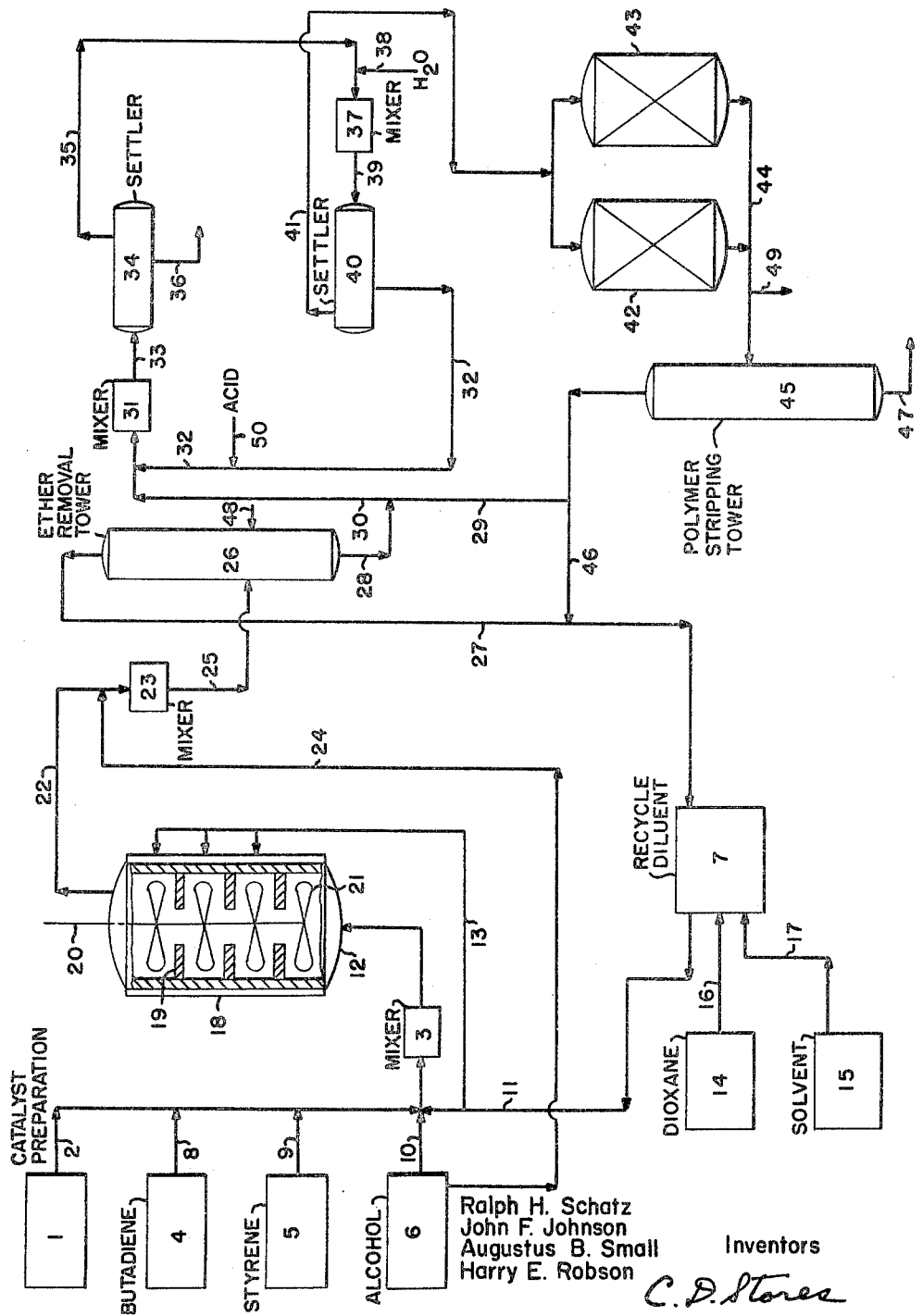

3,270,079
REMOVAL OF ALKALI METAL FROM LIQUID HYDROCARBON POLYMERS
Ralph H. Schatz, Westfield, John F. Johnson, Plainfield, and Augustus B. Small, Westfield, N.J., and Harry Edwin Robson, Baton Rouge, La., assignors to Esso Research and Engineering Company, a corporation of Delaware
Filed Sept. 10, 1962, Ser. No. 222,580
13 Claims. (Cl. 260—680)

This invention relates to a method for the removal of alkali metals from viscous hydrocarbon liquids. The invention relates more particularly to the removal of a finely dispersed alkali metal from the reaction product obtained by the polymerization of an unsaturated hydrocarbon, particularly a conjugated diolefin such as 1,3-butadiene with or without other copolymerizable monomers, e.g., vinyl aromatics such as styrene or its homologues.

It is known to polymerize various unsaturated hydrocarbons such as olefins or diolefins in the presence of alkali metals or organic compounds thereof such as their alkyl derivatives to produce polymers of high molecular weight such as resins, rubbery materials, drying oils, and the like.

The products obtained by the above polymerization reactions contain the alkali metal or soluble forms thereof dispersed or dissolved therein, and these must be removed prior to use in order to avoid the normal hazards due to the presence of free metal and to avoid the effects of alkalinity if the product comes into contact with water. Furthermore, the curing rates of rubber-like compounds are increased by the presence of sodium or other alkali metal, and liquid polymeric drying oils are rendered cloudy and their use in coating compositions is hindered. In addition the electrical properties of cured laminates are inferior when the sodium content is above 70 p.p.m.

It has now been found that liquid polymerization products obtained from unsaturated organic compounds by the use of alkali metal catalysts may be treated to remove the alkali metal catalyst by washing the liquid product with large quantities of water containing a small amount of acid in an integrated process as described below.

The invention is particularly applicable to the preparation of drying oils by the polymerization of butadiene or the copolymerization of butadiene-styrene mixtures. In accordance with this process butadiene-1,3 is polymerized alone or 50 to 95 parts by weight of butadiene-1,3 are copolymerized with 5 to 50 parts by weight of a vinyl aromatic, such as styrene, in the presence of 0.5 to 10 parts by weight (based on monomers) of an alkali metal catalyst, such as sodium; other alkali metals such as potassium, lithium, caesium or rubidium may be used. The polymerization is carried out in a reaction diluent at a temperature ranging from 25° to 105° C., preferably between 40° and 85° C., either batchwise or in a continuous process. Materials used as diluents in the polymerization are inert hydrocarbons which remain liquid under the reaction conditions employed. Diluents boiling between about −15° and 200° C. are therefore suitable. The diluents are employed in amounts ranging from 50 to 500, preferably 100 to 200, parts per 100 parts of monomers.

As a practical matter, however, since ethers are used as promoters during the synthesis, it is usually desirable to use a hydrocarbon solvent during polymer synthesis that can be easily separated from the ether by distillation or which forms with the ether an azeotrope that is rich in ether. This will permit recovery of the ether while leaving the bulk of the hydrocarbon diluent with the polymer. For example, if dioxane is the ether used during the polymer synthesis step, then octane would be a particularly suitable solvent. It would be preferable to heptane because the low-boiling octane-dioxane azeotrope contains 90% dioxane compared with the low-boiling heptane-dioxane azeotrope which contains only about 50% dioxane, thus less octane would be taken overhead with ether in a distillation. Also the boiling point spread between the pure solvent and the azeotrope increases from 7° C. for heptane to 26° C. for octane, thus fractionation requirements are reduced with the octane-dioxane system. Other solvents than octane which may be used are higher boiling paraffins, olefins and aromatic hydrocarbons.

Alternatively the synthesis may be carried out in a low boiling diluent, such as propane, butane or other hydrocarbon boiling lower than the ether used, and a higher boiling hydrocarbon solvent may be added to the feed tray of the distillation column in a solvent replacement step so the ether, e.g., dioxane, and light boiling hydrocarbon may be taken overhead and the polymer removed from the bottom as a solution in the higher boiling diluent. The ether and accompanying solvent may be recycled to the reactor or the ether and solvent may be separated by distillation and the ether only recycled to the reactor. The solution of polymer in solvent removed from the bottom of the distillation zone of the primary separation tower is diluted with additional solvent to reduce its viscosity and contacted with acidified water in one or more stages to convert the alkali metal catalyst residues to water soluble forms and extract these compounds into the water phase.

In the solvent replacement type of operation where the polymerization is carried out in a diluent boiling lower than the ether used, and a replacement solvent is added on the feed tray of the ether removal tower, it is often convenient to use, as replacement solvent, diluents which are required for later processing steps. For example, when the polymer is to be oxidized, an aromatic diluent, such as benzene, toluene or xylene, is required. It is convenient to add this aromatic diluent as replacement solvent, removing the ether-polymerization diluent mixture overhead from the ether recovery tower for recycle to the polymerization reactor, recovering the polymer in replacement solvent as a bottom stream, contacting this polymer solution with acidified water in one or more stages, separating the phases, and using the washed polymer solution which is free of sodium catalyst residues as feed for the oxidation reaction. Alternately, vinyl toluene or styrene may be used as replacement solvents and the resulting polymer solution after washing with acidified water may be dried and used directly as a laminating agent in the preparation of glass-polymer laminates.

The ethers used as modifiers are employed in amounts of about 10–40 parts of ether per 100 parts of monomers. The use of the ethers is highly desirable since they improve the reproducibility of the process, shorten the initial induction period, control the product molecular weight, and are particularly effective in producing a substantially colorless product. Particularly suitable ethers are those boiling below 125° C. such as dioxane and diethyl ether.

It is also desirable to include 1 to 35 parts by weight of an alcohol based on 100 parts by weight of catalyst in the recipe to activate the catalyst. Suitable alcohols include methanol, isopropanol, normal pentanol, and the like.

The process of the present invention is particularly applicable to the multi-stage continuous process described and claimed in U.S. Patent No. 2,791,618, issued May 7, 1957, in the name of James E. Moise et al.

According to the present invention the effluent from the polymerization zone comprising liquid polymer or copolymer dissolved in hydrocarbon solvent, ether promoter, free alkali metal catalyst, or salts thereof is distilled to remove the ether. Any free alkali metal in the effluent should be neutralized before distillation by the addition of water, acid, or isopropyl alcohol, or the like because the presence of active alkali metal in the polymer could degrade the polymer quality at the distillation temperature.

Acids which may be used to acidify the aqueous ether wash mixture include hydrochloric, sulfuric, acetic, carbonic, hydrofluoric and the like. However, preferred acids are those which are volatile at the polymer stripping temperature of about 175° C. so that residual amounts of acid in the polymer-hydrocarbon-ether phase will be removed from the polymer along with hydrocarbon and ether in the polymer stripping operation.

The washed polymer is yellow in color, hazy and often contains traces of gel particles which cause imperfections in surface coating applications.

It has been determined that when films of the reactor product are laid down on 5″ x 7″ steel panels (D panels) and baked, the presence of more than 10 eyeholes per panel indicates a product of unsatisfactory quality. The addition of a silicone "anti-eyeholing agent" has been found to eliminate "eyeholing" provided the product initially does not give more than 10 eyeholes per D panel (5 x 7 in.) or 5 eyeholes per Q panel (4 x 6 inches). However, the use of a silicone "anti-eyeholing agent" is not the preferred technique.

The washed polymer in accordance with an additional feature of this invention is trickled through a fixed bed of fuller's earth, attapulgus or other clay to further purify the product. This produces colorless, gel-free polymer.

The clay bed is regenerated periodically, in situ, with hot naphtha. About four weights of polymer per weight of clay can be treated before regeneration is required. Valuable diluent and polymer left in the bed are recovered by flushing the bed with cold naphtha before regenerating or discarding the bed.

It is therefore one object of this invention to remove finely dispersed alkali metal from a hydrocarbon liquid.

It is another object of this invention to remove alkali metal alkyls and other similar highly reactive and soluble compounds of alkali metals from inert liquids.

It is a further object of this invention to polymerize an unsaturated organic compound in the presence of a catalytically active form of an alkali metal and subsequently recover a resulting polymeric material free from said alkali metal.

It is a further object to effect such sodium metal removal and recover the polymerization diluent and ether in a form suitable for recycle to the polymerization step.

Other objects and advantages of this invention will become apparent to one skilled in the art from the accompanying disclosure and discussion when read in connection with the accompanying drawing which is a schematic illustration of the invention.

Referring now to the drawing, a finely divided suspension of alkali metal catalyst, for example, sodium in octane, from catalyst preparation vessel 1, is introduced by line 2 into mixer 3. Simultaneously butadiene from tank 4, styrene from tank 5, alcohol from tank 6, and recycle diluent from tank 7 are passed by lines 8, 9, 10, and 11, respectively, into mixer 3 and introduced into the lowermost stage of reactor 12. Recycle diluent from tank 7 is introduced through line 13 to each of the second and succeeding stages of the reactor as needed. Dioxane from tank 14 and octane solvent from tank 15 are introduced as makeup to the recycle diluent in tank 7 through lines 16 and 17, respectively.

The reactor itself consists of a large vessel 12 surrounded by cooling jacket 18 and divided into stages by means of horizontal baffles 19. A vertical shaft 20 bearing blades 21 is disposed centrally in vessel 12 as an agitator. Polymerization occurs in reactor 12 and the viscous polymer solution passes from stage to stage by overflowing between the baffles 19. The polymer solution passes from the reactor by line 22 to mixer 23 where it contacts isopropyl alcohol introduced through line 24 to neutralize any free sodium present, otherwise the presence of free sodium in the dioxane removal tower would degrade the polymer at the temperatures prevailing therein. The neutralized effluent passes from mixer 23 through line 25 to dioxane removal tower 26. This tower is operated at a bottoms temperature of 157° C. and a top temperature of 116° C. to remove an octane-dioxane mixture containing 80 mol percent dioxane and 20 mol percent octane overhead through line 27 for recycling back to the recycle diluent storage tank 7. A solution of polymer in octane and substantially free of dioxane is removed through line 28 and diluted with octane from line 29 to a concentration of 15 wt. percent polymer. The diluted polymer solution is passed by line 30 to mixer 31 where it is mixed with acidified water introduced through line 32 from settler 40 in a ratio of about one-tenth to one volume of water per volume of polymer solution. The mixture of acidified water and polymer solution from mixer 31 is then passed by line 33 to settling drum 34. After settling has taken place, usually in 5 to 10 minutes, washed polymer solution is withdrawn through line 35 and passed to orifice mixer 37 where it is contacted with fresh water from line 38. The mixture of water and polymer solution from mixer 37 is passed by line 39 to settling drum 40. After complete settling has taken place, usually in one to two hours, the completely washed polymer solution is withdrawn through line 41 and passed to clay towers 42 and 43 arranged in parallel. In these towers the yellowish polymer is percolated through clay such as fuller's earth or attapulgus or other clay to remove color bodies and gel particles and produce a colorless gel-free product which yields films which are free from surface imperfections. The purified polymer solution is then passed by line 44 to stripper 45 where it is stripped under vacuum at a bottoms temperature of 175° C. to remove octane overhead through line 46 which is then recycled, part to the recycle diluent storage drum and part by way of line 29 to dilute the polymer bottoms from the ether removal tower. Finished polymer is withdrawn from the bottom of stripper 45 through line 47 and passed to storage. If desired, the polymer product may be withdrawn from clay towers 42 and 43 and passed to storage.

Spent wash water from settling drum 34 is withdrawn through line 36 and discarded, while spent wash water from drum 40 is withdrawn through line 32 and used as the acidified wash water in drum 34. Hydrochloric acid is added by line 50 to this wash water in an amount equal to 1.0–2.0 moles of acid per mole of sodium in the polymer solution. Other acids such as acetic or sulfuric may be used if desired.

An alternative method of operating this process is to employ a low boiling diluent such as butane, pentane or other hydrocarbon boiling lower than the ether modifier as the solvent used in reactor 18 and to introduce the resulting effluent into the ether removal tower 26 through line 25. Xylene, vinyl toluene naphtha or other replacement solvent is added at the feed tray of tower 26 through line 48 to replace the synthesis diluent-ether mixture which is taken over head through line 27 whereby a solution of copolymer in xylene, vinyl toluene or naphtha is recovered as a bottoms product and removed through line 28. The concentration of the polymer in the xylene or vinyl toluene can be controlled by the amount of replacement solvent added through line 48. The final washed and clay treated solution of polymer in replacement solvent flowing in line 41 may be withdrawn through line 49, if desired, and passed directly to other processing units, for example to a unit for preparing oxidized polymer wherein the polymer is blown with air in an aromatic hydrocarbon solvent. Furthermore, if desired in the case where the polymer is to be oxidized the solvent used in reactor 12 may be xylene, in which case no replacement solvent is necessary. Dioxane alone is removed overhead from tower 23 through line 24 and polymer dissolved in xylene is withdrawn through line 25. By operating with either of these latter two alternatives, the final polymer stripping tower 45 can be eliminated when all of the final product flowing in line 44 is to be oxidized. When vinyl toluene or styrene is used as the replacement solvent, the polymer solution may be azeotropically dried and used in the preparation of polymer glass laminates.

From the above description it is evident that free alkali metal or its salts may be removed from a hydrocarbon polymer containing same as a contaminant from synthesis by washing with large volumes of water without encountering any emulsion problems.

As will be evident by those skilled in the art, various modifications of this invention can be made or followed in light of the foregoing disclosure and discussion without departing from the spirit or scope of the disclosure or claims.

The following specific examples are presented to illustrate the effects of the present invention. All quantities are expressed in this specification and claims on a weight basis unless stated otherwise.

*Example I*

A butadiene-styrene polymer oil was prepared from the following charge.

| | Parts |
|---|---|
| Butadiene-1,3 | 80 |
| Styrene | 20 |
| Naphtha | 200 |
| Dioxane | 40 |
| Isopropanol | 0.2 |
| Sodium | 1.5 |

The polymerization was carried out at a temperature of 50° C. in a 5-stage continuous commerical unit. The catalyst was destroyed by the addition of isopropyl alcohol sufficient to neutralize all of the sodium. The neutralized product was distilled to remove the dioxane and the dioxane-free product was fed through a steam heated exchanger where it was heated to the required washing temperature. Well water was heated in another steam heat exchanger and then mixed with a metered flow of dry hydrogen chloride just before contacting the hydrocarbon feed. The hydrochloric acid-hydrocarbon mixture was then fed into a dispersator vessel where contacting of acid and sodium took place.

The HCl to sodium mole ratio in the feed ranged from 1.27 to 2.35. For a 1/1 hydrocarbon to aqueous volume ratio the HCl concentration in the aqueous acid ranged from 0.2 to 0.7 wt. percent.

Contacting of acid and sodium was carried out in a 25 gallon glass lined vessel at 180–210° F. Contact times ranged from 15 to 25 minutes. The vessel was agitated with a 4" diameter dispersator driven at 3450 r.p.m. by a 3.0 H.P. drive.

From the dispersator vessel the mixture overflowed into an insulated settler where separation of the hydrocarbon phase from the aqueous phase occurred.

Separation of aqueous phase from hydrocarbon phase was accomplished in two 168 gallon insulated vessels. The settlers were tilted at an angle of 5° from horizontal with feed entering the high end and product overflowing from the low end. Water was discharged from the bottom of the low end to the sewer. The water-hydrocarbon interface level was maintained at 3 to 5 inches from bottom discharge point in the first settler. This left approximately 95% of the liquid volume for hydrocarbon separation. The second settler was completely flooded with overflow from the first settler and the water that settled out in this vessel was drawn off periodically.

Settling temperatures ranged from 170 to 205° F. and pressure on the settlers varied from 5 to 10 p.s.i.g. The hydrocarbon overflow from the first settler was fed directly into a second settler. The straw-colored, turbid product from the settler having a Gardner color of 2+ was then percolated at room temperature by gravity flow through a 500 ml. column charged with 400 ml. of 60 mesh fuller's earth having a diameter of 1½ inches and a height of 16 inches. The effluent from the bottom of the column was clear and water-white with a Gardner color of 0. Films were laid down both from the product directly from the settler and after percolation. The former was found to eyehole badly while the latter had substantially no eyeholes.

The nature of the present invention having been thus fully set forth, what is claimed as new and useful and desired to be secured by Letters Patent is:

1. In a process for polymerizing a conjugated diolefin in the presence of a hydrocarbon solvent for the polymer, boiling −150 C.–200° C., dioxane, and an alkali metal catalyst, the improvement which comprises recovering a solution of polymer in a mixture of solvent and dioxane containing alkali metal impurities; neutralizing the alkali metal with an aliphatic alcohol containing 1 to 4 carbon atoms; separating the dioxane from the polymer solution; washing the dioxane-free solution with 0.1 to 1 volume of acidified water per volume of polymer solution to remove the alkali metal; and withdrawing a solution of polymer in hydrocarbon solvent free of dioxane and alkali metal.

2. In a process for polymerizing a conjugated diolefin in the presence of a hydrocarbon solvent, boiling −15° C.–200° C. dioxane, and an alkali metal catalyst, the improvement which comprises recovering a solution of polymer in a mixture of solvent and dioxane containing alkali metal; neutralizing the alkali metal; separating the dioxane from the polymer solution; recycling the dioxane to the polymerization step; washing the dioxane-free polymer solution with 0.1 to 1 volume of acidified water per volume of polymer solution to remove the alkali metal impurities; settling said mixture to form a lower layer containing water and salts of said alkali metal impurities and an upper layer containing polymer dissolved in hydrocarbon, free of dioxane and alkali metal impurities; percolating said polymer dissolved in hydrocarbon through a bed of adsorbent clay; separating hydrocarbon solvent from polymer and recycling said hydrocarbon solvent to said polymerization step.

3. Process according to claim 2 wherein a plurality of stages of contacting are employed, and the polymer-hydrocarbon solvent phase and the acidified water phase are passed from stage to stage in a countercurrent fashion.

4. Process according to claim 2 in which the alkali metal is neutralized with an aliphatic alcohol having 1 to 4 carbon atoms.

5. Process according to claim 2 in which the alkali metal is neutralized with an acid.

6. Process according to claim 5 in which the hydrocarbon solvent is naphtha and the acid is hydrochloric.

7. Process according to claim 2 in which the hydrocarbon solvent is chosen from the group consisting of toluene and xylene.

8. Process according to claim 2 in which carbon dioxide is used to acidify the water phase 9. In a process for polymerizing a conjugated diolefin in the presence of dioxane, a hydrocarbon solvent, boiling −15° to 125° C., and an alkali metal catalyst, the improvement which comprises recovering a solution of polymer in a mixture of solvent and dioxane containing alkali metal; neutralizing the alkali metal; introducing said mixture into a distillation zone wherein hydrocarbon solvent and dioxane are removed overhead and recycled to said polymerization step, and a replacement hydrocarbon solvent higher boiling than the dioxane and hydrocarbon solvent is introduced to said distillation zone at a point at least as high as that at which the feed is introduced; withdrawing the polymer from the bottom of the distillation zone as a dioxane-free solution in replacement solvent; washing said polymer solution with 0.1 to 1 volume of acidified water per volume of polymer solution to remove alkali metal metal impurities; settling the mixture to form a lower layer containing water and salts of said alkali metal impurities and an upper layer containing polymer dissolved in replacement solvent; separating the layers, recovering a solution of polymer in replacement solvent whereby further distillation to recover a pure polymer free of solvent is not required, and percolating said polymer solution through a bed of adsorbent clay to produce a water-white product which forms substantially eyehole-free films.

10. Process according to claim 9 in which the alkali metal is neutralized with an aliphatic alcohol having 1 to 4 carbon atoms.

11. Process according to claim 9 in which the alkali metal is neutralized with an acid.

12. Process according to claim 9 in which the polymerization solvent is a butane-butene mixture and the replacement solvent is chosen from the group consisting of benzene, toluene, xylene, styrene and vinyl toluene.

13. Process according to claim 9 in which the polymerization solvent is pentane and the replacement solvent is chosen from the group consisting of benzene, toluene, xylene, styrene and vinyl toluene.

References Cited by the Examiner
UNITED STATES PATENTS

| | | | |
|---|---|---|---|
| 2,712,561 | 7/1955 | Gleason | 260—669 |
| 2,732,412 | 1/1956 | Gleason et al. | 260—669 |
| 2,733,267 | 1/1956 | Koenecke et al. | 260—669 |
| 2,813,136 | 11/1957 | Mertz | 260—680 |
| 2,979,509 | 4/1961 | Warner | 260—683.15 |

PAUL M. COUGHLAN, Jr., *Primary Examiner.*

ALPHONSO D. SULLIVAN, *Examiner.*